March 19, 1940.  K. K. SHEPARD  2,194,237

SHIFT TYPE CHRONOMETRIC DEVICE

Filed Dec. 15, 1937

Inventor.

Kelvin K. Shepard

By Stephen Cerstvik

Attorney.

Patented Mar. 19, 1940

2,194,237

UNITED STATES PATENT OFFICE 2,194,237

SHIFT TYPE CHRONOMETRIC DEVICE

Kelvin K. Shepard, Baltimore, Md., assignor to Bendix Aviation Corporation, South Bend, Ind., a corporation of Delaware Application December 15, 1937, Serial No. 180,013

18 Claims. (Cl. 235—104)

The present invention relates to precision instruments and more particularly to chronometric means for such precision instruments.

One of the objects of the present invention is to produce a novel chronometric means for producing a timed indication in an indicating instrument.

Another object is to provide a novel chronometric means whereby a remote indication of a timed phenomenon may be produced.

Still another object is to provide a novel chronometric device comprising axially shiftable members.

Another object is to provide a novel chronometric device for indicating the average rotational speed of a rotating member during a predetermined interval of time.

A still further object is to provide a novel means of measuring and indicating the velocity of the wind impinging upon a wind actuated element of an anemometer.

A further object is to provide novel means for counting the number of impulses received per unit of time.

Another object is to provide novel means for measuring and transmitting an indication of the speed of a rotating part or the force causing such rotation, when the relationship of such force and the number of revolutions of said part per unit of time is known, said means, in a broad sense, comprising means for electrically transmitting the revolutions of said part and means for totalizing said revolutions during a measured time interval.

The above and further objects and novel features of the invention will appear more fully hereinafter from the following detailed description when read in connection with the accompanying drawing. It is to be expressly understood, however, that the drawing is for the purpose of illustration and description only and is not designed as a definition of the limits of the invention, reference being had for this purpose to the appended claims.

In the drawing, wherein like reference characters refer to like parts throughout the several views.

The present invention comprehends novel chronometric means for measuring a timed phenomenon and for producing an indication of said phenomenon either locally or remotely.

Figure 1:
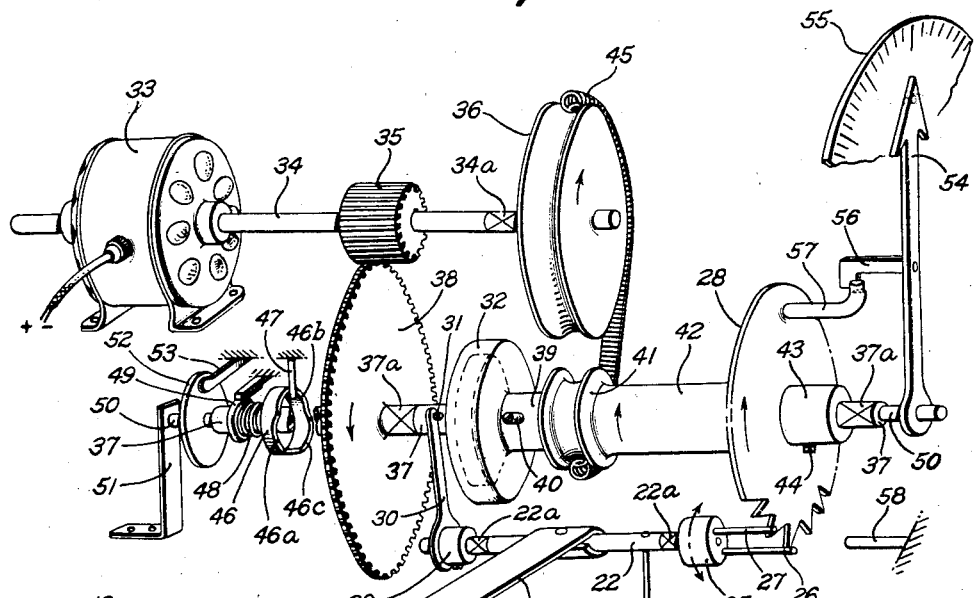
Fig. 1 is a diagrammatic view of one form of the invention.
Figure 1:
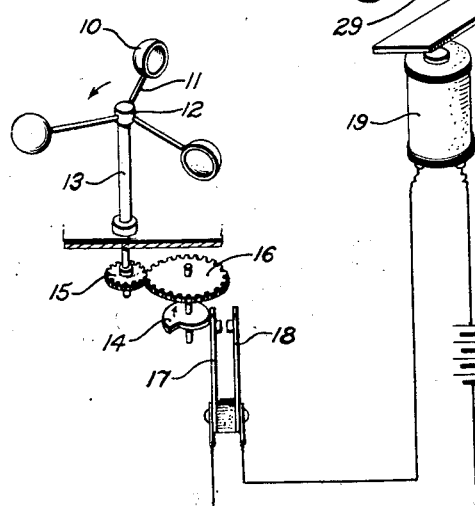

Referring to the drawing and more particularly to Fig. 1, the invention is illustrated as applied to the indication of a natural phenomenon such as wind velocity and, in the embodiment illustrated, comprises a rotating cup anemometer for determining and transmitting wind velocity. It is to be expressly understood, however, that the invention is not to be so limited but that it may be applied to the determination and indication of any timed phenomenon.

The anemometer illustrated is of the familiar three cup rotating type, the cups 10 thereof being mounted on arms 11 which are in turn secured to and extend radially from a rotatable spindle or shaft 12 journaled in a vertical support or shaft housing 13. Cups 10 are so designed and the lengths of arms 11 are so proportioned that shaft 12 will be rotated at a speed bearing a known relation to the velocity of the wind impinging on said cups. It will accordingly be seen that by measuring the speed of shaft 12, the wind velocity may be readily determined either mathematically or by proper calibration of an instrument for indicating said measurements.

Novel means are accordingly provided for determining the speed of shaft 12, said means comprising apparatus for transmitting and counting or totalizing the number of revolutions of said shaft during a time interval of a predetermined duration.

The sending unit of said totalizing means, in the form shown, includes a cam 14 adapted to be rotatably driven by shaft 12 through reduction gears 15 and 16. Cam 14 engages one of a pair of resilient contacts 17 and 18 and is adapted to move the same into engagement with each other at least once during each revolution of the cam or after each predetermined number of revolutions of shaft 12, said number depending upon the relative sizes of gears 15 and 16. It will be apparent that contacts 17 and 18 may be closed more than once during each revolution of cam 14 by providing said cam with additional lobes.

The receiving unit in the illustrated embodiment comprises an electro-magnet 19 constituting electro-magnetic means and adapted to be in circuit with a source of electric energy 20, the opening and closing of contacts 17 and 18 being effective to intermittently energize the electromagnet connected in circuit with the source 20 and contacts 17 and 18.

When electro-magnet 19, for example, is energized, the same causes movement of an arm or armature 21 which is pivotally mounted for oscillatory angular movement with escapement shaft 22 journaled in bearings 22a against the efforts of a resilient element or spring 23 fastened at one end and connected with shaft 22 at the other end by means of a hook 24.

Figure 2:
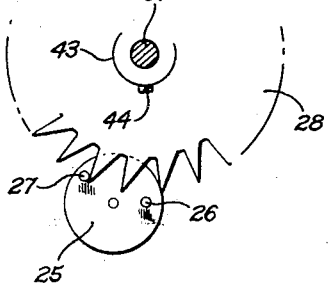
Fig. 2 is an enlarged, detailed view illustrating the action of the phenomenon operated escapement.

Secured to one end of shaft 22 is the escapement element 25 provided with pins 26 and 27. The oscillation of arm 21 by electro-magnet 19 oscillates shaft 22 and escapement element 25 whereby the pins 26 and 27 control the rotation of escapement wheel 28 as shown in detail in Fig. 2.

Secured to the opposite end of shaft 22 by means of collar 29 is an escapement lock arm 30 carrying pin 31 which cooperates with lock rim 32 to lock the escapement against oscillation by electro-magnet 19 and arm 21, during a predetermined step in the cycle of operations as will be explained in detail later.

In order to produce an indication of the wind velocity as represented by the rotation of the anemometer cups, novel means are provided including a timing mechanism, indicating means and means for coordinating the timing mechanism and indicating means.

As indicated in Fig. 1, a constant speed motor 33 supplied with energy from a source (not shown) continuously rotates in a clockwise direction as indicated by the arrow, a shaft 34 journaled in bearings 34a carrying integral therewith driving pinion 35 and escapement wheel drive pulley 36.

Integral with hollow main shaft 37 journaled in bearings 37a is gear 38 meshing with driving pinion 35 which thereby rotates shaft 37 to control the cycle of operations as will be set out in detail later. Mounted on shaft 37 by means of collar 39 and set screw 40 is the lock rim 32 adapted for cooperation with lock arm 30. Floating on shaft 37 near one end thereof and free to rotate in the opposite direction thereon, as indicated by the arrow, is the escapement wheel assembly comprising escapement wheel rotating pulley 41 integrally connected to escapement wheel 28 by the hollow sleeve 42 and held against axial displacement on shaft 37 by means of collar 43 cooperating with collar 39. The set screw 44 on collar 43 provides means for regulating the distance between the collars 39 and 43. The escapement wheel assembly is rotated by means of a spring belt 45 passing around the pulleys 36 and 41 which belt serves as a slipping clutch drive for the escapement wheel assembly. This assembly is rotated in a clockwise direction when the escapement mechanism is in operation, but when the escapement mechanism is locked by arm 30, pin 31 and lock rim 32, said belt 45 serves as a slipping clutch whereby pulley 36 rotates without rotating pulley 41.

Integral with shaft 37 near the opposite end thereof is the cycle timing cam 46 provided with three lifts, 46a, 46b and 46c. Cam 46 is resiliently urged to the right against its fixed follower pin 47 by means of a resilient element comprising a coil shift spring 48 abutting the fixed backing element 49 encircling shaft 37 and allowing reciprocation of said shaft through said element.

Floating within hollow main shaft 37 is the shaft 50 free to rotate with said hollow shaft and slidably mounted for reciprocating movement within said shaft.

Abutting one end of said shaft 50 is the fixedly mounted spring arm 51 which urges shaft 50 to the right to thereby urge brake disc 52 integral with shaft 50, against the brake shoe 53 which is fixedly mounted in position, and so located as to bear against the brake disc 52 adjacent the outer edge thereof to thereby prevent rotation of shaft 50 with the hollow shaft 37.

At the other end of shaft 50 is carried the pointer 54 mounted for movement over scale 55 to indicate the value of the wind velocity represented by the rotating cups 10. Arm 56 mounted on pointer 54 is so located as to be operated by arm 57 of the escapement wheel 28 when said wheel is in integrating position. Zero stop pin 58 for the escapement wheel 28 is firmly mounted and so located as to abut arm 57 when escapement wheel 28 is axially moved to the right by spring 48, whereby said wheel 28 may be freely rotated by the pulley 41 without striking the arm 56 of the pointer 54.

The operation of the device is as follows:

Wind impinging upon cups 10, causes shaft 12 to rotate at a speed proportional to the velocity of said wind, the revolutions which said shaft will make per unit of time for any given wind velocity depending upon the size of the cups and the radius of arms 11. After each predetermined number of revolutions of shaft 12, said number being dependent upon the relative size of gears 15 and 16, cam 14 is effective to move contact 17 into engagement with contact 18 to close a circuit through the electro-magnet 19, thereby energizing said electro-magnet.

Assume, by way of example, that the cups 10 and arms 11 are designed to be rotated at a speed of 920 R. P. M. by wind having a velocity of 80 knots, or an equivalent of about 11½ R. P. M. per knot. Also, assume that the design of gears 15 and 16 is such that a speed of 320 R. P. M. is imparted to cam 14 through said gears by a wind traveling at 80 knots. For each knot of wind, therefore, cam 14 will revolve four times per minute or once every fifteen seconds. If the fifteen second interval is taken as the counting or totalizing interval, it will be apparent that the number of revolutions of cam 14 and, hence, the number of times electro-magnet 19 is energized during such interval, will equal the velocity of the wind in knots during that interval. Since pointer 54 is moved a predetermined distance each time electro-magnet 19 is energized it will also be apparent that the distance said pointer is moved from its reference position during each of said fifteen second intervals will be indicative of the number of revolutions made by shaft 12 during that time and, hence, of the velocity of the wind acting on cups 10.

As illustrated in Fig. 1, the cam 46 is rotatably mounted with the cam rise 46b held against the cam follower 47 and rotating so as to ride thereover. In this position of cam 46 the chronometric device is in the integrating or counting phase of the complete cycle. If we assume that the pointer 54 and escapement wheel 28 are both at zero position; and that the length of cam rise 46b is equivalent to fifteen seconds because gears 38 and 35 and motor 33 are so designed as to produce a fifteen second counting interval, the operation is as follows:

During the fifteen seconds that cam rise 46b is riding over the cam follower pin 47, electro-magnet 19 is being intermittently energized to thereby oscillate arm 21 with each energization and, hence to oscillate the escapement pins 26 and 27. Pins 26 and 27 allow one tooth of escapement wheel 28 to rotate in a clockwise direction for each energization of electro-magnet 19 and by means of arms 57 and 56, pointer 54 is moved over scale 55. On the basis of the above described assumption of the revolution of cam 14, namely, that cam 14 rotates once each fifteen seconds per each knot of wind, then each movement or step of pointer 54 represents a wind velocity of one knot and the total number of steps or movements of said pointer during the counting interval represents the actual wind velocity in knots.

At the end of the fifteen second interval, cam lift 46b is no longer riding over cam follower pin 47 as cam lift 46c has rotated into position to ride over said follower pin.

As cam lift 46c rides over cam follower pin 47, shaft 37 is axially moved to the left to abut brake disc 52 and thereby free it from the braking action of brake shoe 53. Simultaneously, escapement lock rim 32 is moved axially into position to contact pin 31 and thereby lock the escapement shaft 22 by means of said pin 31 and arm 30, whereby the escapement wheel 28 and arm 57 are locked in the last step position.

As we have assumed that the pointer 54 and escapement wheel 28 both started from zero position, arms 56 and 57 will be in contact and, therefore, the pointer 54 will merely be held in position.

If, however, the device has been operating for some time, and assuming that during the previous counting interval wheel 28 had carried pointer 54 to an indication higher than the indication now shown by the said wheel 28, shaft 50 will be rotated by rotating shaft 37 to thereby rotate pointer 54 in a counter-clockwise direction until arm 56 abuts the present position of arm 57. This rotation is possible because brake disc 52 has been removed from brake shoe 53 by the contact of the end of shaft 37 which in turn acts as a friction drive on shaft 50.

If, during the present counting interval, however, wheel 28 has rotated to a position higher than during the preceding counting interval, arm 57 will abut arm 56 as soon as the position of wheel 28 is equal to that of the indication in the previous time interval and from then on arm 57 will carry arm 56 and pointer 54 to the higher indication.

The extent of cam lift 46c is so chosen as to give the pointer 54 opportunity to move to the lower position of wheel 28 whenever such a position is assumed by said wheel.

As cam 46 continues to rotate the lift 46c out of contact with cam follower pin 47, said cam and shaft 37 are shifted quickly to the right by spring 48 as soon as cam lift 46c leaves the cam follower pin 47 and lift 46a begins to ride over said cam follower pin.

Since shaft 37 no longer abuts brake disc 52, shaft 50 is moved to the right by spring arm 51 until disc 52 abuts brake shoe 53. Pointer 54 is therefore now held in its last position.

Movement of main shaft 37 releases the escapement shaft 22 as escapement lock rim 32 is removed from contact with pin 31. Simultaneously, however, escapement wheel 28 is carried beyond the ends of escapement pins 26 and 27 and arm 57 is carried beyond arm 56 and out of alignment therewith. Thus, while pointer 54 is held in position, escapement wheel 28 on shaft 42 is left free to rotate in a clockwise direction until arm 57 abuts zero stop pin 58.

Cam lift 46a is so designed as to allow the escapement wheel 28 sufficient time to return to its zero position, whereupon cam lift 46b again engages cam follower pin 47, and arm 57 is disengaged from zero stop pin 58 upon the axial shifting of element 28 to the left by the cam lift 46b and a new integrating period is initiated wherein arm 57 again starts from zero position.

There are thus provided novel means for measuring, transmitting and indicating the speed of a rotating member or the value of the forces tending to rotate the same, which indication is intermittently corrected. The indication obtained will be exact for a constant speed member and will represent for a predetermined time interval the average speed of a member which is not operated at a constant or uniform speed.

Although only one embodiment of the invention has been illustrated and described, other changes and modifications in form, materials and relative arrangement of parts, which will now appear to those skilled in the art, may be made without departing from the scope of the invention. Reference is therefore to be had to the appended claims for a definition of the limits of the invention.

What is claimed is:

1. In an apparatus of the class described, electro-magnetic means, means for intermittently energizing the same, an escapement adapted to be actuated by said electro-magnetic means, rotating means controlled by said escapement whereby a step by step rotation ensues, and means including axially shiftable means for releasing said escapement and said rotating means.

2. In an apparatus of the class described, electrical means, means for intermittently energizing the same, an escapement adapted to be actuated by said electrical means, rotating means controlled by said escapement whereby a step by step rotation ensues, and means including axially shiftable means for locking said escapement and said rotating means.

3. In an apparatus of the class described, a rotatable member, a movable element, means for moving said element a predetermined distance for each predetermined number of revolutions of said member during a time interval of predetermined duration, and means for rendering said last named means inoperative to move said element after the termination of said interval, including means movable axially upon the termination of said interval to lock said moving means upon said axial movement.

4. In an apparatus of the class described, a rotatable member, electrical means, means for intermittently energizing said electrical means in accordance with the number of revolutions of said rotatable member, a movable element, means controlled by said electrical means for causing intermittent movement of said movable element, and means mounted for axial movement whereby said control means and said movable element are disengaged to permit free rotation of said movable element.

5. In an apparatus of the class described, escapement means, means for intermittently operating the same, rotating means connected to said escapement means whereby intermittent rotation is produced, means including a rotatable cam for releasing said escapement means and said rotating means, means for rotating said cam at constant speed whereby said releasing occurs at regular intervals, indicating means actuated by said rotating means in one direction upon the intermittent movement thereof, means for moving said indicating means in the other direction, means for holding said indicating means against movement in said other direction whereby summation of said intermittent movement is achieved, and means operated by said rotatable cam for locking said escapement and rotating means and simultaneously releasing said holding means.

6. In an indicating instrument for indicating the value of a phenomenon, a rotatable element, means for rotating said element at constant speed, means controlled by said phenomenon for intermittently regulating the rotation of said rotating element during a predetermined interval, cam means mounted for movement of rotation and axial movement connected to said constant speed means for rotation thereby, and means axially movable upon axial movement of said cam means for locking said rotating means to thereby terminate the predetermined interval.

7. An indicating instrument comprising a first hollow rotatable shaft, means for rotating said shaft at constant speed, a second hollow shaft mounted coaxially with said first hollow shaft, an indicating element, means mounted coaxially with said hollow shafts for actuating said indicating element in one direction, means connected to said first hollow shaft aligned with said indicating element for actuating said indicating element in the other direction, and cam means mounted on one of said hollow shafts for causing axial movement thereof, whereby said aligned means are relatively displaced.

8. In a device of the character described, a first hollow rotatable shaft, means for rotating said shaft at constant speed, means intermittently controlling said rotation, a second hollow shaft coaxial with said first hollow shaft, said constant speed means continuously rotating said second hollow shaft, a third shaft coaxial with said hollow shafts, and means including said second shaft rotated by said constant speed means for simultaneously controlling said intermittent means and axially moving said third shaft.

9. In a device of the character described, means rotating at constant speed, means rotatable by said constant speed means, an indicator actuated by said rotatable means, means intermittently controlling said rotatable means during a predetermined cycle, means holding said indicating means after each step during said intermittent rotation, and axially shiftable means controlled by said constant speed means for simultaneously determining the duration of said cycle and for releasing said indicating means.

10. In a device of the character described, a rotatable element, means driving said rotatable element at constant speed, means for intermittently controlling the rotation of said element, means actuated by said constant speed means for determining the time interval of said intermittent control, indicating means moved intermittently in one direction by said rotatable element, means holding said indicating means in position after each of said intermittent movements whereby said movement is integrated by said pointer, and axially shiftable means controlled by said actuated means whereby said indicating means is released by said holding means at the end of said time interval.

11. A chronometric device comprising a rotatable element, means including a slipping clutch device for driving said element at constant speed, means for intermittently controlling the rotation of said element, locking means engageable with said intermittent means mounted for reciprocation axially of said rotatable element, and cam means driven by said constant speed means to reciprocate said locking means whereby said intermittent means may be locked periodically.

12. A chronometric device comprising a constant speed rotating element, indicating means, means driven by said constant speed means, projecting means on said driven means and on said indicating means for rotating said indicating means in one direction by said driven means when said projecting means are in alignment, and means for rotating said indicating means in the opposite direction, said last named means comprising means actuated by said constant speed means.

13. A shifting chronometric device comprising rotatable means, constant speed means for rotating said rotatable means, means engageable with said rotatable means for intermittently controlling said rotatable means during a predetermined period, means driven by said constant speed means for controlling the time duration of said period, and means shiftable by said driven means for axially moving said rotatable means out of engagement with said intermittent means.

14. A chronometric device comprising a pulley, means rotatably driving said pulley at constant speed, an indicating element, means driven by said pulley for rotating said indicating element in one direction, timing means rotatably driven by said constant speed means and mounted for reciprocating movement, means for rotating said indicating element in the other direction, brake means for holding said indicating means in any position thereof, and escapement means controlling said driven means, said timing means comprising a rotating cam whereby said escapement means are locked in position during a part of the rotation of said cam and said brake means are actuated to a non-holding position whereby said indicating element may be rotated in said other direction.

15. In a device of the character described, a first shaft, a pointer carried by said shaft, a hollow shaft surrounding said first shaft, means for rotating said hollow shaft at constant speed whereby said pointer may be actuated in one direction, a second hollow shaft encircling said first hollow shaft, means for driving said second hollow shaft at constant speed, means on said second hollow shaft cooperating with means on said pointer for rotating said pointer in the other direction, and cam means carried by one of said hollow shafts to reciprocate said shaft periodically whereby said pointer may be actuated alternately in said one direction and in said other direction.

16. In a device of the character described, a pointer, rotatable means for rotating said pointer in one direction, means for holding said pointer against said rotation, means for rotating said pointer in the other direction, and means carried by said rotatable means for axially shifting the same, whereby said pointer holding means are released and said pointer is permitted to rotate in said one direction.

17. A chronometric device comprising an escapement, means intermittently actuating said escapement, a rotatable element in contact with said escapement and controlled thereby, said rotating element comprising a hollow shaft, means for rotating said shaft at constant speed, a second hollow shaft coaxial with said first hollow shaft, means actuated by said constant speed means for rotating said second shaft, cam means mounted for rotation with said second hollow shaft, said cam means comprising three lifts, a third shaft coaxial with said first two shafts, pointer means carried by said third shaft, means for locking said pointer in any position thereof, means on said first hollow shaft for engaging said pointer upon alignment therewith, axially shiftable means on one of the hollow shafts adapted to lock said escapement, and means riding said three lifts, whereby said axially shiftable means lock said escapement and release said locking means during the contact of one of said lifts with said riding means, and whereby said engaging means on said first hollow shaft are disengaged from said pointer and said second hollow shaft is rotated freely of said pointer during the contact of another of said lifts with said riding means, and whereby said axially shiftable means are shifted to unlocked position and said means on said first hollow shaft are aligned with said pointer during the contact of the other of said lifts with said riding means.

18. A chronometric tachometer comprising an electrical contacting device, means for periodically actuating said contacting device in accordance with the speed to be measured, electro-magnetic means controlled by said contacting device, means rotating at constant speed, means rotatable by said constant speed means, an indicator actuated by said rotatable means, means actuated by said electro-magnetic means for intermittently controlling said rotatable means during a predetermined interval of time, means for holding said rotatable means against rotation during another predetermined interval of time, and means controlled by said constant speed means for determining the duration of said intervals of time and for simultaneously releasing said holding means.

KELVIN K. SHEPARD.